A. ELLSWORTH
SHOCK ABSORBER.
APPLICATION FILED SEPT. 20, 1909.
968,753.
Patented Aug. 30, 1910.
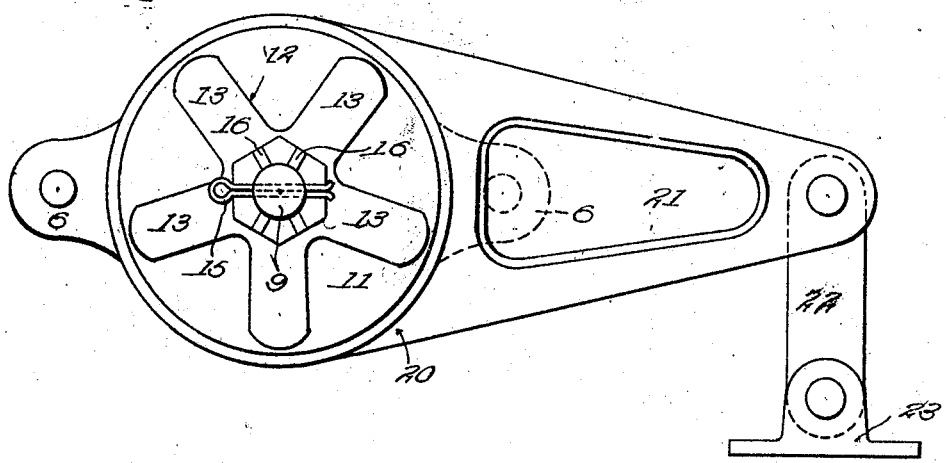
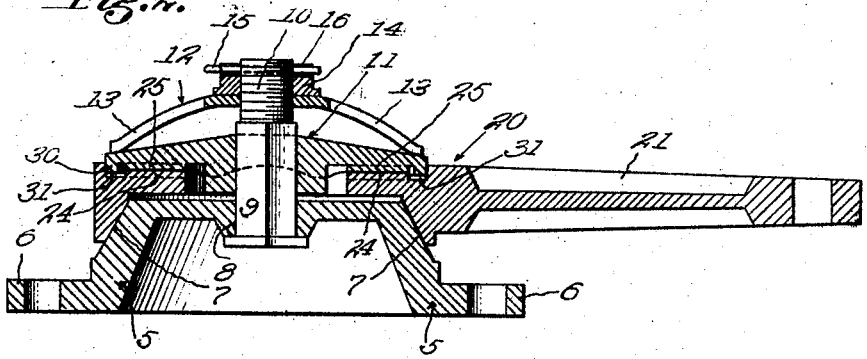
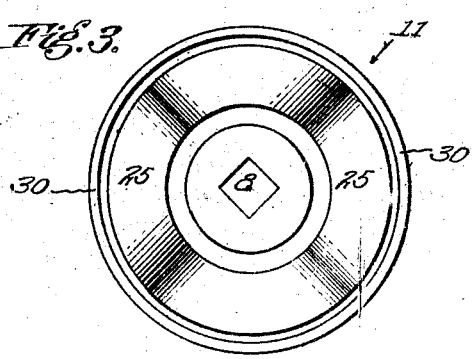
Witnesses
Inventor
Augustus Ellsworth
by James T. Barkelew
his Attorney.

UNITED STATES PATENT OFFICE.

AUGUSTUS ELLSWORTH, OF LOS ANGELES, CALIFORNIA.

SHOCK-ABSORBER.

968,753.  Specification of Letters Patent.  Patented Aug. 30, 1910.

Application filed September 20, 1909. Serial No. 518,473.

*To all whom it may concern:*

Be it known that I, AUGUSTUS ELLSWORTH, a citizen of the United States, residing at Los Angeles, in the county of Los Angeles and State of California, have invented new and useful Improvements in Shock-Absorbers, of which the following is a specification.

The object of this invention is to provide a simple absorber which may be easily and cheaply manufactured and will give good results under adverse conditions. For this purpose an absorber having a relatively large friction area has been designed, and a means provided and the area so formed as to have the largest amount of friction possible per unit of surface. Concretely, this is embodied in a combination of a cone shaped friction surface and a cam means for imposing a variable pressure on that surface, the pressure varying according to position. The cam may be arranged to throw added pressure onto the friction surface in any manner desired and in quantity depending upon the weight of the vehicle to which it is attached and the character of action of the springs supporting that vehicle on its chassis.

In addition to the force varying operation of the cam the pitch of the cone introduces a constant force multiplying factor by which the pressure on the conical friction surface is increased. This pitch may also be varied in different structures to suit the needs of any particular vehicle, a light vehicle requiring a cone of larger base and smaller height than a heavy one. There are limiting conditions, however, in both directions. If the pitch of the cone is made too great, the height too great in proportion to the base, the two conical engaging surfaces are apt to stick together and thus offer an impediment to the smooth working of the absorber. On the other hand, if the pitch is made too small a spring exerting a large pressure is required as the pressure multiplication factor of the cone is small.

In the accompanying drawings I have shown an absorber in approximately correct proportions and of about three quarters size for an average auto-vehicle. In this case the pitch of the cone is about sixty degrees, and the cam is arranged to transmit a normal pressure to the friction surface when the absorber is in its normal position; and upon movement of the parts of the absorber to positions on either side of the normal position, an increasing force is transmitted from the frame to the friction surface. The amount of this increase and the pitch of the conical friction surface may be varied to suit any particular requirements, as may also the different structural features depending upon these proportions.

In the accompanying drawings, Figure 1 is a side elevation of my absorber. Fig. 2 is a longitudinal section thereof. Fig. 3 is a plan view of the inner side of the cam member.

Referring to the drawings, 5 designates a base member having tabs 6 for being secured to the chassis frame. This member is in the shape of a hollow cone frustum and has a conical outer friction surface 7 of about sixty degrees pitch. An aperture 8 in its center is adapted to receive the square shank of bolt 9, the bolt projecting through the member and having a screw threaded portion 10 on its outer end. Also fitted on the square shank of bolt 9 is a cam member 11. On top of this member is a spring 12 of the general configuration shown, having fingers 13 which press against the cam member. The spring is held down by nut 14 on screw threaded portion 10 of bolt 9, the nut being prevented from jarring loose by means of a pin 15 engaging with slots 16 in the nut.

Mounted between the cam member and the base member is a friction member 20 having an arm 21 adapted on its end for attachment to the spring or axle of the vehicle as circumstances may require. In this case a connecting strap 22 and bracket 23 are provided for this purpose. Friction member 20 has on one side a conical friction face which engages with the conical friction surface of the base member, and on the other side has a cam formation 24. This cam is annular in form and engages with a similar cam formation 25 on the under side of the cam member. With the cams in the position shown, the normal position, the cam member is as close to the base member and as far from the spring as possible. The pressure exerted by the spring on the cam member is thus a minimum. When the friction member is rotated to either side of its normal position the cam member is forced away from the base member and toward the spring, the spring being thus contracted and made to exert a greater pressure on the cam member.

This increased pressure is transmitted through the cam and friction member to the friction surface and an increased retarding force is thus brought upon the vibrations of the vehicle body.

In the present construction I have provided for the exclusion of dust and grit from the interior of the absorber by the provision of a flange 30 on the cam member fitting into a groove 31 in the friction member. By this means the dust and grit are excluded from the cam and friction surfaces of the absorber, insuring long life.

Having described my invention, I claim:—

1. A shock absorber, comprising a base member having a conical friction surface thereon, a friction member having a similar surface on one side engaging with the surface on the base member, and having on the other side a cam surface, a cam member having a cam surface thereon in engagement with the cam surface on the friction member, and spring means for pressing the base member and the cam member together to hold the friction member between them.

2. A shock absorber, comprising a base member having a conical friction surface thereon, a friction member having a similar surface on one of its sides for engagement with the conical friction surface of the base member, the friction member having a cam surface on its other side, an arm attached to the friction member whereby it may be moved, a cam member having a cam surface in engagement with the cam surface on the friction member, a bolt passing through the base member and the cam member and holding them from relative rotation but permitting their movement to and from each other, and a spring mounted on the bolt and pressing the cam member toward the base member and against the friction member.

3. A shock absorber, comprising a base member having a conical friction surface thereon, a friction member having a similar surface on one side and a cam surface on the other side, the friction member being revoluble with reference to the base member, a cam member having a cam surface in engagement with the cam surface on the friction member, a bolt mounted on the base member and extending through the friction member and the cam member, the cam member being slidably and non-rotatively mounted on the bolt, and a spring mounted on the bolt and pressing the cam member toward the base member.

4. A shock absorber, comprising a base member having a conical friction surface thereon, a friction member having a similar surface on one side and a cam surface on the other side, the friction member being revoluble with reference to the base member, a cam member having a cam surface in engagement with the cam surface on the friction member, a squared bolt passing through the base member the friction member and the cam member, the base and cam members non-rotatively engaging the bolt, a head on one end of the bolt, an adjustable nut on the other end, and a spring beneath the nut and pressing upon the cam member.

In witness that I claim the foregoing I have hereunto subscribed my name this 14th day of September, 1909.

AUGUSTUS ELLSWORTH.

Witnesses:
  JAMES T. BARKELEW,
  ELWOOD H. BARKELEW.